US007813112B2

(12) United States Patent
Ge et al.

(10) Patent No.: US 7,813,112 B2
(45) Date of Patent: Oct. 12, 2010

(54) BATTERY COVER LATCHING ASSEMBLY AND PORTABLE ELECTRONIC DEVICE USING THE SAME

(75) Inventors: Peng-Jin Ge, Shenzhen (CN); Hsiao-Hua Tu, Taipei Hsien (TW); Jun Wang, Shenzhen (CN); Gang Yang, Shenzhen (CN); Yong-Hui Sun, Shenzhen (CN); Wen-Wei Song, Shenzhen (CN)

(73) Assignees: Shenzhen Futaihong Precision Industry Co., Ltd., ShenZhen, Guandgong Province (CN); FIH (Hong Kong) Limited, Kowloon (HK)

( * ) Notice: Subject to any disclaimer, the term of this patent is extended or adjusted under 35 U.S.C. 154(b) by 958 days.

(21) Appl. No.: 11/616,841

(22) Filed: Dec. 27, 2006

(65) Prior Publication Data

US 2008/0042448 A1    Feb. 21, 2008

(30) Foreign Application Priority Data

Aug. 18, 2006    (CN) .......................... 2006 1 0062190

(51) Int. Cl.
*H05K 5/00* (2006.01)
*H05K 7/00* (2006.01)
*H04M 1/00* (2006.01)
*H01M 2/10* (2006.01)

(52) U.S. Cl. .............................. 361/679.01; 455/575.1; 429/97

(58) Field of Classification Search ............ 361/679.01, 361/679.02, 679.58; 455/575.1, 575.8; 429/97, 429/100
See application file for complete search history.

(56) References Cited

U.S. PATENT DOCUMENTS

| 5,621,618 | A  | * | 4/1997  | Komiyama .................. 429/97 |
| 5,716,730 | A  | * | 2/1998  | Deguchi ...................... 429/97 |
| 6,114,625 | A  | * | 9/2000  | Hughes et al. .............. 429/100 |
| 6,171,138 | B1 | * | 1/2001  | Lefebvre et al. .............. 429/97 |
| 6,479,184 | B1 | * | 11/2002 | Shiue ........................ 429/100 |
| 6,563,927 | B2 | * | 5/2003  | Mote et al. ............. 379/433.11 |
| 6,665,544 | B1 | * | 12/2003 | Michel et al. ............ 455/550.1 |
| 7,160,144 | B2 | * | 1/2007  | Nguyen et al. ................ 429/97 |
| 7,274,554 | B2 | * | 9/2007  | Kang et al. ............ 361/679.01 |
| 7,318,731 | B2 | * | 1/2008  | Lin et al. ...................... 439/97 |
| 7,441,813 | B2 | * | 10/2008 | Qin et al. ..................... 292/163 |
| 7,606,022 | B2 | * | 10/2009 | Kim ........................ 455/575.1 |
| 7,629,074 | B2 | * | 12/2009 | Li et al. ........................ 429/97 |
| 2002/0131584 | A1 | * | 9/2002 | Mote et al. ............. 379/428.01 |
| 2004/0192418 | A1 | * | 9/2004 | Nam ........................ 455/575.1 |
| 2005/0084747 | A1 | * | 4/2005 | Allen et al. .................. 429/97 |
| 2006/0141875 | A1 | * | 6/2006 | Nguyen et al. .............. 439/892 |

(Continued)

FOREIGN PATENT DOCUMENTS

CN          1520128 A    8/2004

*Primary Examiner*—Jayprakash N Gandhi
*Assistant Examiner*—Adrian S Wilson
(74) *Attorney, Agent, or Firm*—Jeffrey T. Knapp

(57) ABSTRACT

A cover latching assembly (60) for a portable electronic device (100) is provided. The portable electronic device includes a housing (10) and a cover (20) configured for attaching to the housing. The cover has a latching portion (26) formed thereon. The cover latching assembly includes a button (30) and an elastic member (40). The button includes a recessed portion (344), and the button is slidably secured on the housing. The elastic member enables the latching portion of the cover to engage with the recessed portion of the button.

18 Claims, 6 Drawing Sheets

U.S. PATENT DOCUMENTS

| | | | |
|---|---|---|---|
| 2006/0175840 A1* | 8/2006 | Wang et al. | 292/228 |
| 2006/0176012 A1* | 8/2006 | Lee et al. | 320/107 |
| 2006/0279252 A1* | 12/2006 | Zuo et al. | 320/107 |
| 2006/0281501 A1* | 12/2006 | Zuo et al. | 455/575.1 |
| 2006/0292439 A1* | 12/2006 | Zuo et al. | 429/97 |
| 2007/0003827 A1* | 1/2007 | Zuo et al. | 429/97 |
| 2007/0010219 A1* | 1/2007 | Qin et al. | 455/128 |
| 2007/0026297 A1* | 2/2007 | Qin et al. | 429/97 |
| 2007/0026299 A1* | 2/2007 | Park et al. | 429/97 |
| 2007/0048599 A1* | 3/2007 | Choi | 429/97 |
| 2007/0091556 A1* | 4/2007 | Wu | 361/683 |
| 2007/0122693 A1* | 5/2007 | Qin et al. | 429/97 |

* cited by examiner

BATTERY COVER LATCHING ASSEMBLY AND PORTABLE ELECTRONIC DEVICE USING THE SAME

BACKGROUND OF THE INVENTION

1. Field of the Invention

The present invention generally relates to cover latching assemblies and, more particularly, to a battery cover latching assembly for use in a portable electronic device.

2. Description of Related Art

Batteries are widely used in portable electronic devices, such as personal digital assistants (PDAs), mobile phones, and so on. Typical batteries are attachably received in the electronic device, and battery covers are designed to connect with housings of the electronic devices to package the batteries. The batteries have to be replaced by opening the battery cover when, for example, the batteries are damaged or dead (i.e. no longer rechargeable).

A clasp structure or latch structure is used with a typical battery cover to engage with a housing of a portable electronic device. For example, a mobile phone of the related art has a latch for the battery cover. The latch includes a pair of hooks at one end of the battery cover and a locking pin protruding from the other end of the battery cover. Accordingly, a pair of grooves are defined in an end portion of a backside of a housing of the mobile phone, and a locking hole is defined in the other end portion of the backside of the housing. In assembly, the hooks are inserted into the grooves in the backside of the housing. Then, the battery cover is pressed downwardly onto the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm. However, during disassembly, a relatively large amount of effort is needed to disassemble the battery cover, since a substantial force is exerted thereon. The battery cover can easily be damaged during such disassembly. As a result, it is difficult for a user to replace a battery in the housing of the mobile phone.

What is needed, therefore, is a battery cover latching assembly and a portable electronic device therewith that can overcome the above-mentioned shortcomings.

SUMMARY OF THE INVENTION

In one aspect of the embodiment, a battery cover latching assembly for a portable electronic device is provided. The portable electronic device includes a housing and a cover configured for attaching to the housing. The cover has a latching portion formed thereon. The cover latching assembly includes a button and an elastic member. The button includes a recessed portion, and the button is configured to slidably secured on the housing. The elastic member enables the latching portion of the cover to slidably engage with the recessed portion of the button.

In another aspect, a portable electronic device is provided including a housing, a cover and a cover latching assembly. The cover is configured for attaching to the housing, and has a latching portion formed thereon. The cover latching assembly includes a button and an elastic member. The button includes a recessed portion, and is slidably secured on the housing. The elastic member enables the latching portion of the cover to slidably engage with the recessed portion of the button.

Other advantages and novel features will become more apparent from the following detailed description when taken in conjunction with the accompanying drawings.

BRIEF DESCRIPTION OF THE DRAWINGS

Many aspects of the battery cover latching assembly and the portable electronic device using the same can be better understood with reference to the following drawings. These drawings are not necessarily drawn to scale, the emphasis instead being placed upon clearly illustrating the principles of the present battery cover latching assembly and the portable electronic device using the same. Moreover, in the drawings like reference numerals designate corresponding parts throughout the several views.

DETAILED DESCRIPTION OF PREFERRED EMBODIMENTS

The present battery cover latching assembly is suitable for portable electronic devices, such as mobile phones, PDAs, and so on.

Figure 1:
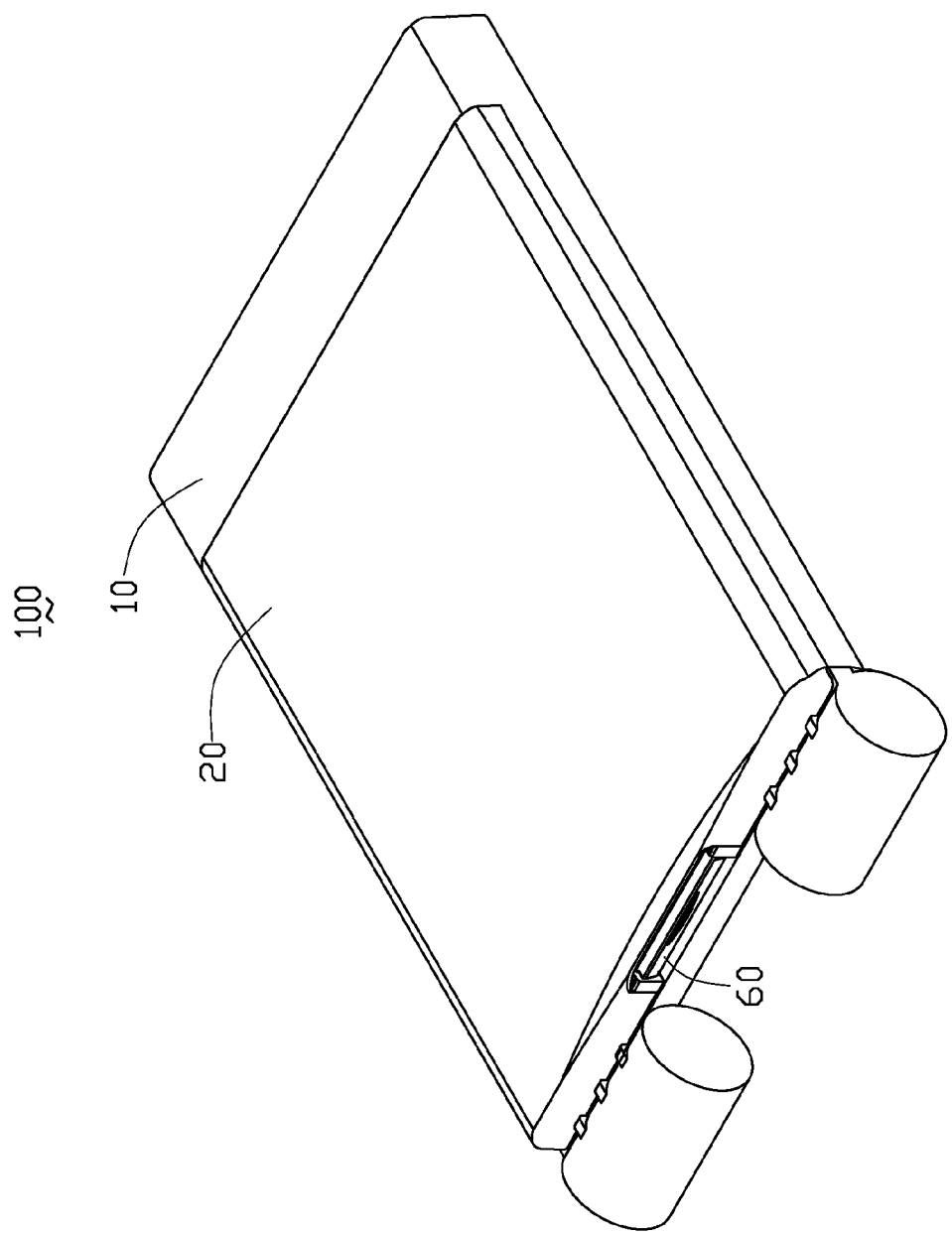
FIG. 1 is an assembled, isometric view of a mobile phone incorporating a battery cover latching assembly in accordance with a preferred embodiment.

Referring now to the drawings in detail, FIG. 1 shows a battery cover latching assembly 60 incorporated in a mobile phone/portable electronic device 100. The mobile phone 100 is taken here as an exemplary application, for the purposes of describing details of the battery cover latching assembly 60 of the preferred embodiment. The mobile phone 100 includes a housing 10 and a battery cover 20, both of which are releasably latched via the battery cover latching assembly 60.

Figure 2:
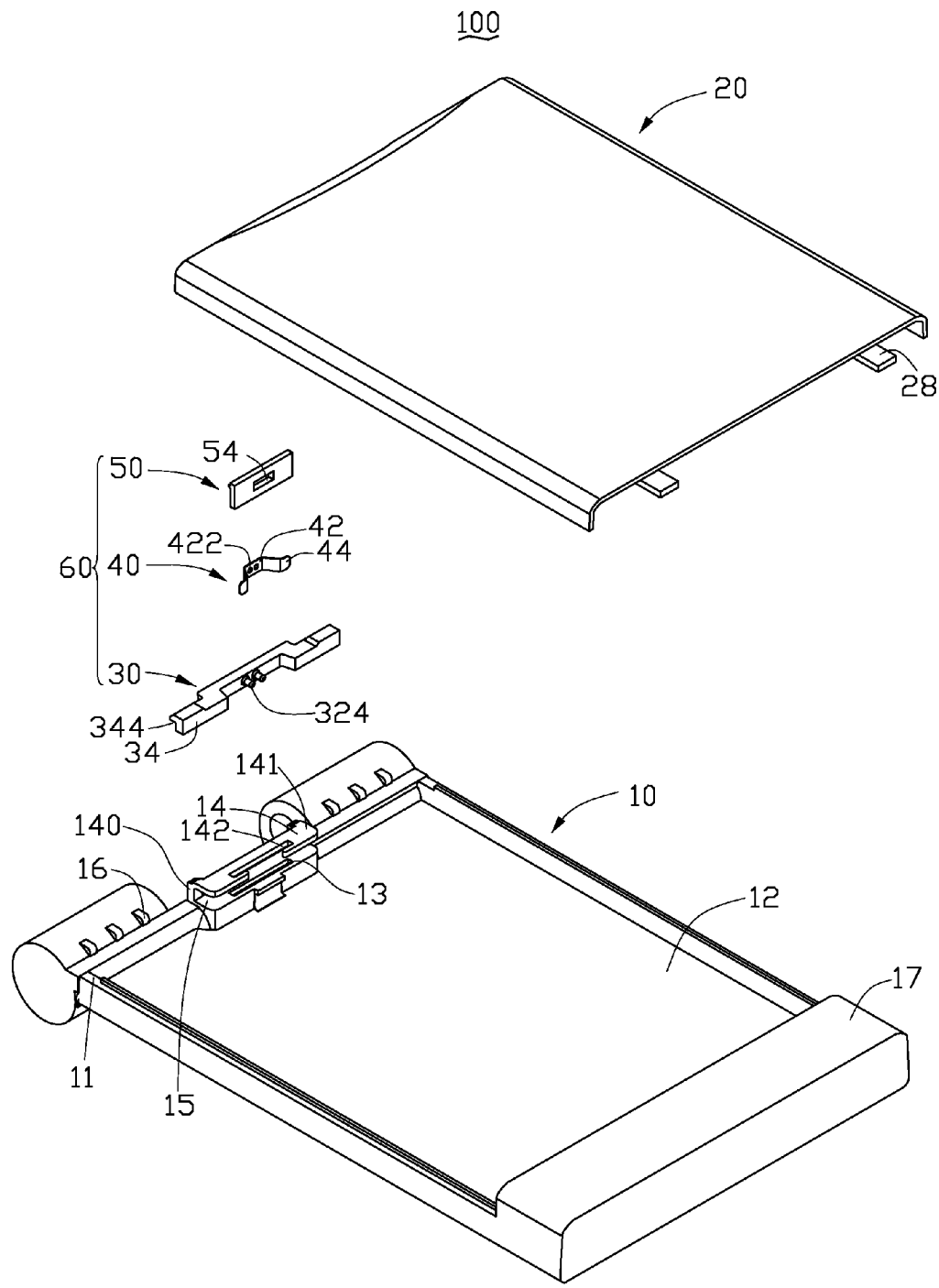
FIG. 2 is a reduced, exploded, isometric view of the mobile phone shown in FIG. 1.
Figure 3:
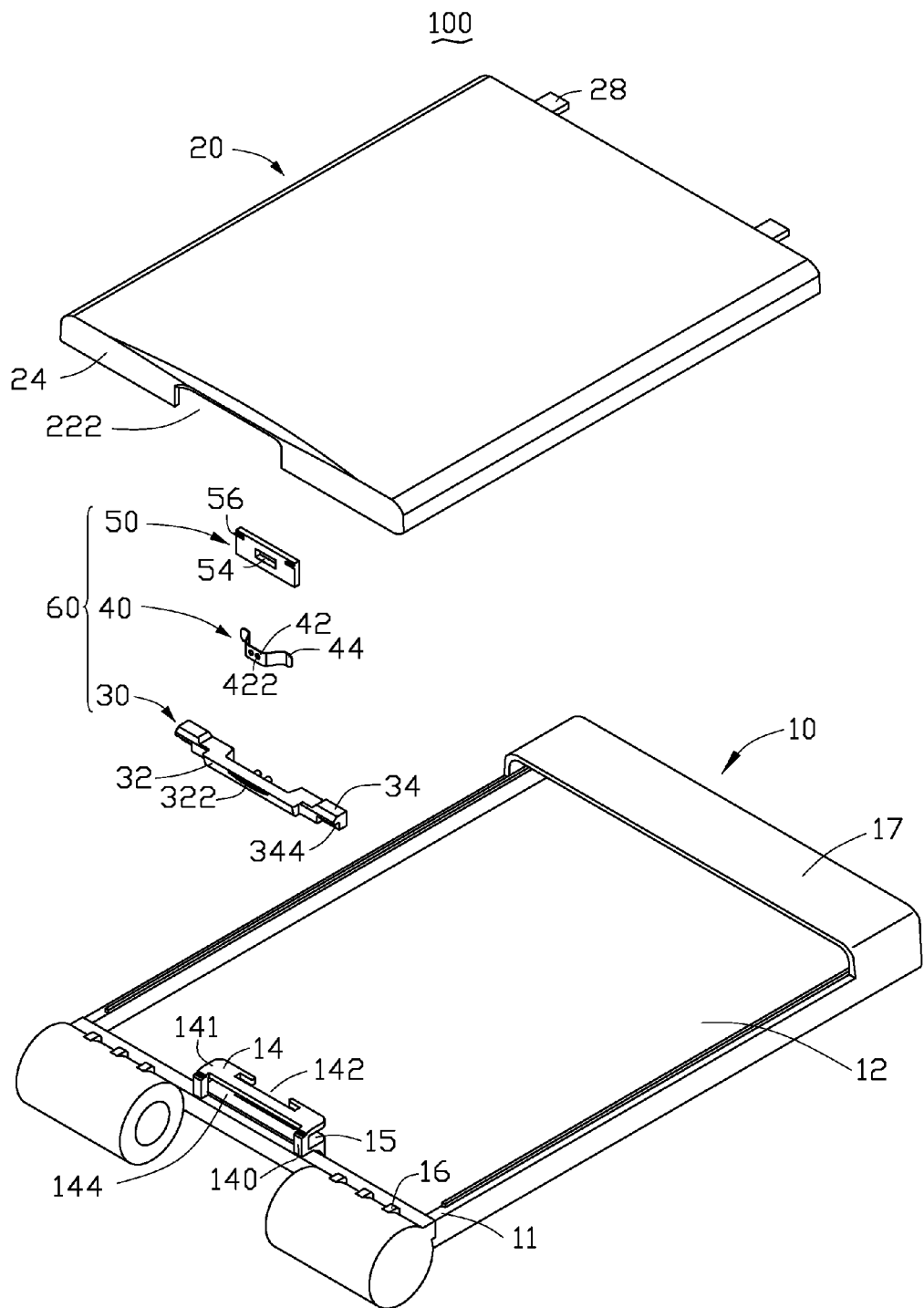
FIG. 3 is similar to FIG. 2, but viewed from another aspect.

Referring also to FIGS. 2 and 3, the housing 10 includes an upper wall 11. The upper wall 11 has a receiving space 12 and a substantial rectangular first slot 13 defined therein, and further has a bent portion 14, a plurality of blocks 16 and a first resisting portion 17 formed thereon. The receiving space 12 is configured to receive a battery (not shown). The first slot 13 is defined at a middle of the upper wall 11, and is located adjacent to an exterior end wall (not labeled) of the housing 10. A first end portion 140 of the bent portion 14 connects with the exterior end wall, and extends a second end portion 141 of the bent portion 14 therefrom located above the first slot 13. The bent portion 14 and the upper wall 11 cooperatively define an accommodating space 15 therebetween. The first end portion 140 has a roughly rectangular opening 144 defined therethrough, and the second end portion 141 has a second slot 142 defined therethrough. Thus, the opening 144 and the second slot 142 communicate with the accommodating space 15. The second slot 142 is of dimensions and shape essentially identical to the first slot 13 of the upper wall 11, and is located right above the first slot 13. The blocks 16 are roughly arcuate, and respectively protrude out from an end of the upper wall 11 adjacent to the bent portion 14, and are evenly distributed along two sides of the bent portion 14. The first resisting portion 17 is bent to form by a generally rectangular sheet. The first resisting portion 17 protrudes out from another end of the upper wall 11 positioned opposite to the bent portion 14, and is located right above the receiving space 12.

Figure 4:
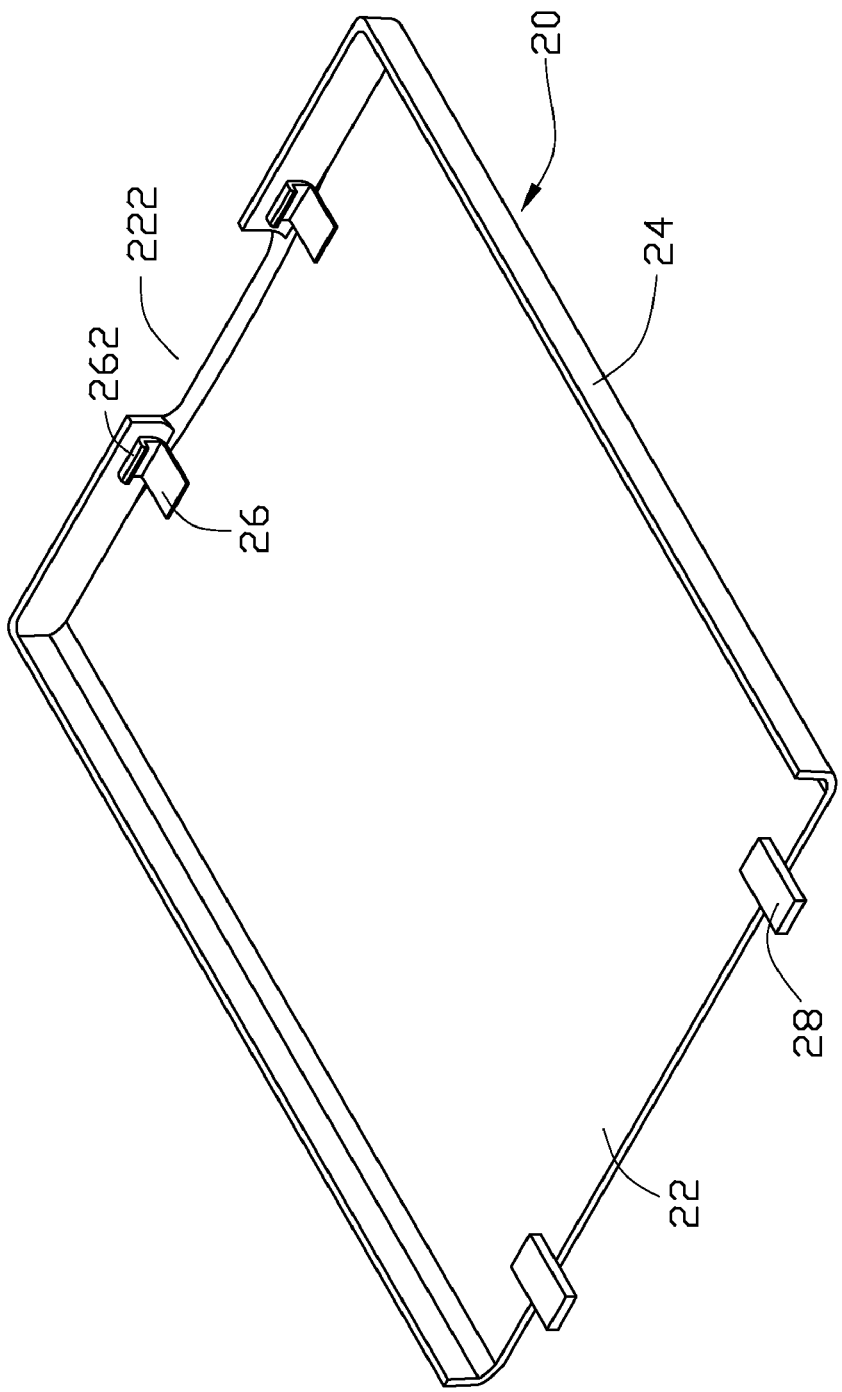
FIG. 4 is an enlarged, isometric view of a battery cover shown in FIG. 2, showing another aspect of the battery cover.

Referring also to FIG. 4, the battery cover 20 is bent to form by a substantially rectangular sheet, and includes a lower wall 22, a peripheral wall 24 with an opening end (not labeled), a couple of latching portions 26 and a pair of second resisting portions 28. An end of the peripheral wall 24 opposite to the opening end has an opening 222 with a preferred rectangular shape defined therethrough. The opening 222 is designed for receiving the bent portion 14 of the housing 10 when the battery cover 20 is assembled with the housing 10. The latching portions 26 are arranged at two sides of the opening 222. Each latching portion 26 has one end hooked, and the hooked ends 262 are projected from the peripheral wall 24 towards the opening end. The second resisting portions 28 are generally sheet-like, and extend out from the opening end of the lower wall 22 in parallel with each other.

Referring to FIGS. 2 and 3, the battery cover latching assembly 60 includes a button 30, an elastic member 40 and a plate 50. The button 30 is generally bridge-like, and of such dimensions that it can slidably engage into the accommodating space 15. The button 30 includes a pressing portion 32 and two bridge portions 34. The pressing portion 32 is transversely connected with two bridge portions 34, and is located therebetween. The pressing portion 32 is generally cube-like, and is of such dimensions that it is exposed through the opening 144 of the bent portion 14 of the housing 10 when the button 30 is assembled with the housing 10. In this preferred embodiment, the pressing portion 32 has a roughly same size and shape as the opening 144. A planar end portion (not labeled) of the pressing portion 32 has an arcuate groove 322 defined therein. A recessed end portion (not labeled) positioned opposite to the planar end portion has two cylindrical posts 324 protruding therefrom. The arcuate groove 322 is adapted for facilitating pressing the button 30. Each bridge portion 34 includes a generally L-shaped recessed portion 344. The recessed portions 344 are configured to engage with the latching portions 26 of the battery cover 20. The elastic member 40 is a plate spring with a generally bridge-like shape. The elastic member 40 includes a main body 42 and two arm portions 44. The main body 42 is transversely connected with two arm portions 44, and is located therebetween. The main body 42 has two through holes 422 defined therethrough, and the two through holes 422 has a size and shape roughly similar to that of the two cylindrical posts 324. The plate 50 should preferably be rectangular, and can slidably engage into the first slot 13 of the housing 10 and the second slot 142 of the bent portion 14 of the housing 10. The plate 50 has a through groove 54 defined therethrough and two protrusions 56 formed thereon. The through groove 54 is located in alignment with the posts 324 when the latching assembly 60 is assembled together. The two protrusions 56 are respectively located at the two sides of through groove 54, and function to securely hold the plate 50 within the first slot 13 and second slot 142.

Figure 5:
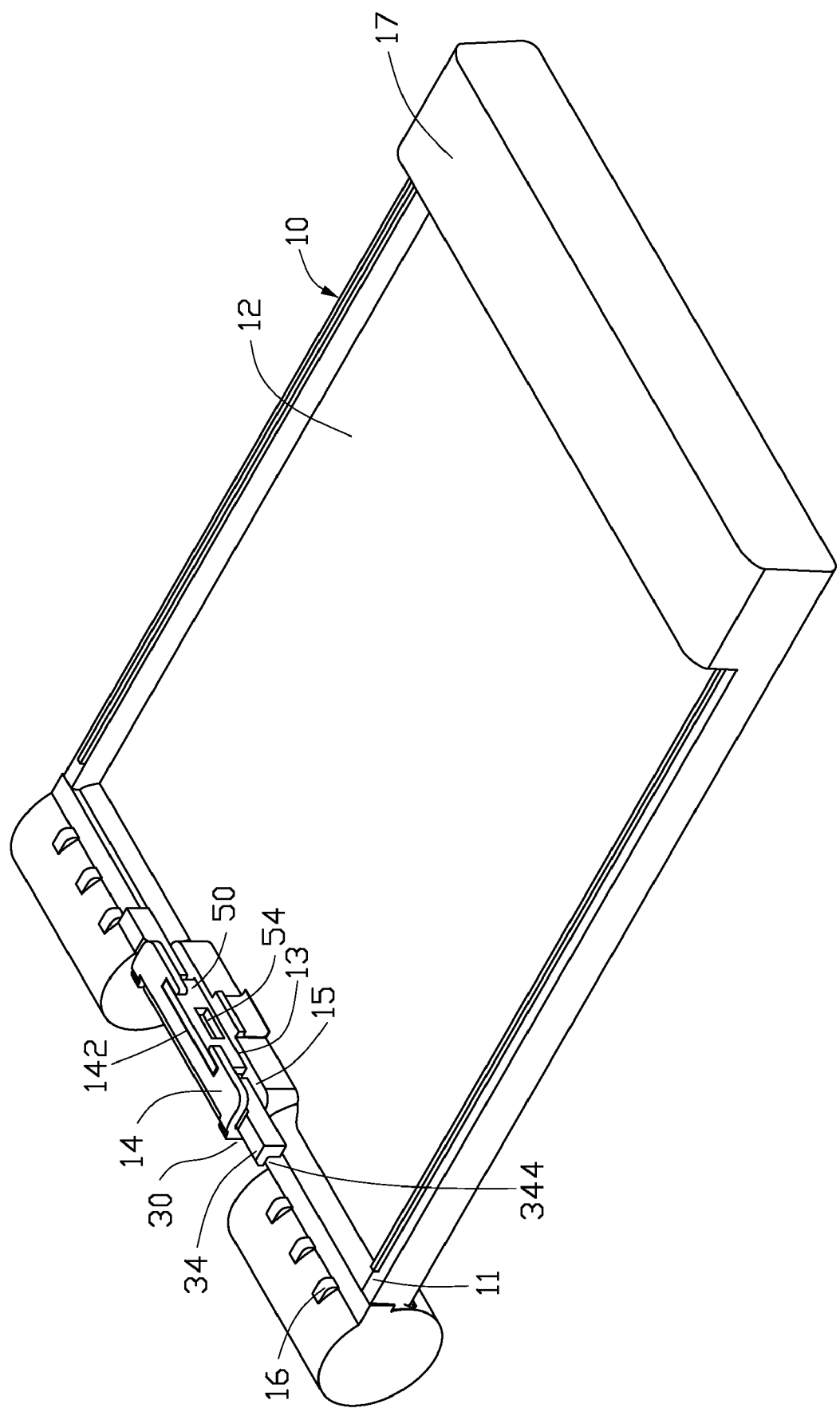
FIG. 5 is an enlarged, isometric view of a housing shown in FIG. 2, showing another aspect of the housing.
Figure 6:
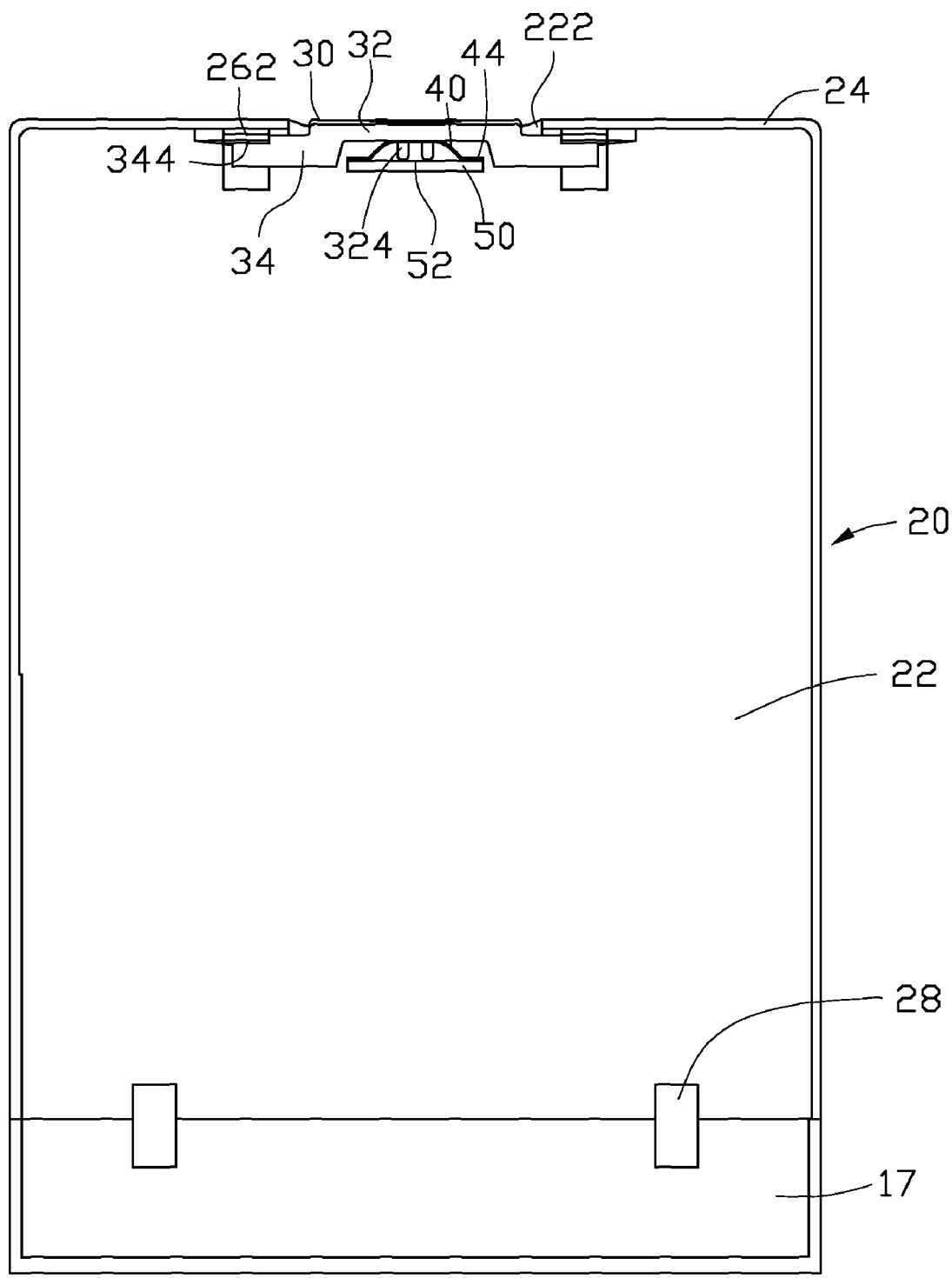
FIG. 6 is a top assembled view of the mobile phone shown in FIG. 2 with the housing omitted.

In assembly of the latching assembly 60 with the housing 10, referring also to FIGS. 5-6, the button 30 of the latching assembly 60 is mounted into the accommodating space 15 of the housing 10. In this case, the pressing portion 32 of the button 30 is exposed through the opening 144. The elastic member 40 is placed over the posts 324 of the button 30 via the posts 324 engaging into the through holes 422 of the elastic member 40, thus the main body 42 of the elastic member 40 abuts against the button 30. The elastic member 40 is pressed against the button 30, while the plate 50 is inserted and engaged into the second slot 142 of the bent portion 14 of the housing 10 and the first slot 13 of the housing 10 to sandwich the elastic member 40 between the plate 50 and the button 30 in a compressed state. The main body 42 abuts against the button 30 and the arm portions 44 abut against the plate 50. The plate 50 is securely held within the first slot 13 and the second slot 142 with the groove 54 thereof aligning with the posts 324 of the button 30, since the protrusions 56 thereof engages with a bottom side of the bent portion 14 adjacent to the second slot 142.

When the battery cover 20 is to be attached to the housing 10 assembled with the latching assembly 60, the second resisting portions 28 are respectively inserted into spaces formed in the first resisting portions 17, and then the battery cover 20 is pressed while snappingly secured on the housing 10. During this process, the hooked ends 262 of the latching portions 26 of the battery cover 20 are pressed to pass along a side of the bridge portions 34 of the button 30 away from the first resisting portion 17. In this case, the button 30 of the latching assembly 60 is urged by the hooked ends 262 of the battery cover 20, and the elastic member 40 of the latching assembly 60 is further compressed. When the battery cover 20 is further pressed, the hooked ends 262 pass over the bridge portions 34 of the button 30 to arrive at the recessed portion 344 of the button 30. At the same time, the elastic member 40 is released to urge the button 30 to move back, and each hooked end 262 is then snappingly secured into a recess of the corresponding recessed portion 344. In this case, the blocks 16 of the housing 10 resist the periphery wall 24 of the battery cover 20.

When the battery cover 20 is to be detached from the housing 10 assembled with the latching assembly 60, the pressing portion 32 of the button 30 of the latching assembly 60 is pressed to move the button 30 toward the first resisting portion 17 in the accommodating space 15 of the housing 10. When the button 30 moves a specific distance in the accommodating space 15, the hooked ends 262 of the latching portions 26 of the battery cover 20 disengage from the recessed portions 344 of the button 30 respectively. Then the battery cover 20 can be removed from the housing 10.

When the button 30 of the latching assembly 60 is pressed, the battery cover 20 can be detached from the housing 10. This configuration allows convenient operation of the device. Also, when the battery cover 20 is attached to the housing 10, the elastic member 40 of the latching assembly 60 automatically returns to its original position. Thus, the battery cover 20 can be stably attached on the housing 10.

In further alternative embodiments, the blocks 16 of the housing 10 can be omitted, accordingly, the upper wall 11 of the housing 10 is configured to resist the periphery wall 24 of the battery cover 20 when battery cover 20 is assembled with the housing 10. The arcuate groove 322 can be omitted. The through groove 54 of the plate 50 of the latching assembly 60 can be omitted, accordingly, the posts 324 of the button 30 of the latching assembly 60 are configured not to interact with the plate 50 when detaching the battery cover 20 from the housing 10. The plate 50 can also be omitted, accordingly, the arm portions 44 of the elastic member 40 are configured to be securely held within the first slot 13 of the housing 10 and the second slot 142 of the bent portion 14 of the housing 10.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover latching assembly for a portable electronic device, the portable electronic device comprising a housing and a cover configured for attaching to the housing, the cover having a latching portion formed thereon, the cover latching assembly comprising:
   a button, the button comprising a recessed portion, the button configured for being slidably secured on the housing; and
   an elastic member, the elastic member configured for enabling the latching portion of the cover to engage with the recessed portion of the button;
   a plate secured on the housing;
   wherein, the housing defines at least two aligned slots, the plate is securely inserted in the slots, and the elastic member is compressed between the button and the plate; wherein the housing comprises an upper wall and a bent portion, the bent portion being formed on the upper wall, wherein the upper wall has one slot of the at least two slots defined therein, the bent portion has the other slot of the at least two slots defined therein.

2. The cover latching assembly as claimed in claim 1, wherein the bent portion and the upper wall defining an accommodating space, the plate, the button and the elastic member being accommodated in the accommodating space.

3. The cover latching assembly as claimed in claim 2, wherein the plate has at least one protrusion formed thereon, the protrusion being engaging with the bent portion for securing the plate to the at least two slots.

4. The cover latching assembly as claimed in claim 2, wherein the button comprises a pressing portion and two bridge portions extending from two opposite ends of the pressing portion.

5. The cover latching assembly as claimed in claim 4, wherein the recessed portion is formed on the bridging portion, the latching portion comprises a hooked end, wherein the hooked end slidably engages with the recessed portion.

6. The cover latching assembly as claimed in claim 4, wherein the bent portion further has an opening defined therethrough, the pressing portion being configured to expose through the opening.

7. The cover latching assembly as claimed in claim 4, wherein the pressing portion has at least one post formed thereon, the elastic member comprises a main body and two arm portions, the two arm portions extending from two ends of the main body, the main body having at least one through hole defined therethrough, the at least one post being engaged into the at least one through hole.

8. The cover latching assembly as claimed in claim 7, wherein the plate has a through groove defined therethrough, the at least one post being configured to pass into the through groove.

9. A portable electronic device, comprising:
   a housing defining at least two aligned slots;
   a cover, the cover being configured for attaching to the housing, the cover having a latching portion formed thereon; and
   a cover latching assembly, the cover latching assembly comprising a button and an elastic member, the button comprising a recessed portion, the button being slidably secured on the housing, the elastic member enabling the latching portion of the cover to slidably engage with the recessed portion of the button;
   the cover latching assembly further comprising a plate secured on the housing;
   wherein, the plate is securely inserted in the slots, and the elastic member is compressed between the button and the plate; wherein the housing comprises an upper wall and a bent portion, the bent portion being formed on the upper wall, wherein the upper wall has one slot of the at least two slots defined therein, the bent portion has the other slot of the at least two slots defined therein.

10. The portable electronic device as claimed in claim 9, wherein the bent portion and the upper wall defining an accommodating space, the plate, the button and the elastic member being accommodated in the accommodating space.

11. The portable electronic device as claimed in claim 9, wherein the button comprises a pressing portion and two bridge portions, the two bridge portions extending from two opposite ends of the pressing portion, the recessed portion is formed on the bridging portion, the latching portion comprises a hooked end, the hooked end detachably engaging with the recessed portion.

12. The portable electronic device as claimed in claim 11, wherein the pressing portion has at least one post formed thereon, the elastic member comprises a main body and two arm portions, the two arm portions extending from two ends of the main body, the main body having at least one through hole defined therethrough, the at least one post engaging into the at least one through hole.

13. The portable electronic device as claimed in claim 9, wherein the housing has a plurality of blocks and a first resisting portion formed thereon, the cover has a second resisting portion formed thereon, the blocks being configured to resist the cover, the second resisting portion being configured to resist the first resisting portion.

14. A portable electronic device comprising:
   a housing comprising a first side with a first resisting portion formed thereon and a second side having a blocking structure and a holding structure formed thereon, a space formed between the first and second sides for containing an electronic component therein;
   a cover for covering the space, the cover comprising a second resisting portion slidably engaging with the first resisting portion in a back-and-forth direction, and a latching portion; and
   a latching assembly comprising a button being slidably engaging with the holding structure and an elastic member, the button comprising a catching portion catchable with the latching portion in an up-and-down direction, and a pressing portion being accessible from outside of the housing, the pressing portion comprising at least one post, the elastic member defining at least one hole, the at least one post engaging through the at least one hole, the elastic member mounted between the button and the holding structure configured for urging the catching portion to catch the latching portion in the up-and-down direction after the latching portion slides over the catching portion in the up-and-down direction, wherein
   the blocking structure abuts against the cover toward the first resisting portion after the latching portion engages with the catching portion and the pressing portion is pressable to move the catching portion toward the first resisting portion to release the latching portion.

15. The portable electronic device as claimed in claim 14, wherein the blocking structure comprises a plurality of blocks each having a slanted surface, and the cover is slidable along the slanted surfaces away from housing after the catching portion releases the latching portion.

16. The portable electronic device as claimed in claim 14, wherein the holding structure comprises an U-shaped holder comprising a pair of horizontal walls parallel to the cover and a vertical wall connecting ends of the horizontal walls, a space being formed between the horizontal and vertical walls, the button being slidably mounted in the space with the catching portion extending out of the space.

17. The portable electronic device as claimed in claim 16, wherein the horizontal walls define a pair of aligned slots, the holding structure further comprises a plate securely inserted in the slots, and the elastic member is compressed between the button and the plate.

18. The portable electronic device as claimed in claim 14, wherein the housing defines at least two aligned slots, the holding structure further comprising a plate secured on the housing; the plate is secured in the slots, and the elastic member is compressed between the button and the plate.

* * * * *